United States Patent
Takemura

(10) Patent No.: US 8,908,243 B2
(45) Date of Patent: Dec. 9, 2014

(54) IMAGE FORMING APPARATUS FOR MEASURING FIXED IMAGE

(71) Applicant: Canon Kabushiki Kaisha, Tokyo (JP)

(72) Inventor: Taichi Takemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/648,182

(22) Filed: Oct. 9, 2012

(65) Prior Publication Data

US 2013/0094039 A1 Apr. 18, 2013

(30) Foreign Application Priority Data

Oct. 13, 2011 (JP) ................. 2011-226024

(51) Int. Cl.
  *H04N 1/46* (2006.01)
  *H04N 1/60* (2006.01)
(52) U.S. Cl.
  CPC ........... *H04N 1/6091* (2013.01); *H04N 1/6033* (2013.01)
  USPC .............. 358/504; 358/1.9; 358/518; 399/49; 399/67; 399/72; 399/122; 399/400; 399/320; 399/321
(58) Field of Classification Search
  None
  See application file for complete search history.

(56) References Cited

U.S. PATENT DOCUMENTS

| | | | |
|---|---|---|---|
| 3,958,880 A | 5/1976 | Washio et al. | |
| 5,083,152 A | 1/1992 | Tokuda | |
| 5,600,427 A | 2/1997 | Watanabe et al. | |
| 5,784,090 A | 7/1998 | Selensky et al. | |
| 5,963,756 A * | 10/1999 | Sakai et al. | 399/39 |
| 6,344,902 B1 | 2/2002 | Duke et al. | |
| 6,731,889 B2 * | 5/2004 | Nakayama | 399/49 |
| 6,853,815 B2 | 2/2005 | Tezuka et al. | |
| 7,224,916 B2 * | 5/2007 | Iwakawa | 399/49 |
| 7,318,585 B2 * | 1/2008 | Soshiroda | 271/176 |
| 7,460,796 B2 * | 12/2008 | Itagaki et al. | 399/15 |
| 7,650,092 B2 * | 1/2010 | Oyumi | 399/38 |
| 7,738,810 B2 | 6/2010 | Fujita | |
| 7,813,659 B2 | 10/2010 | Kawaguchi | |

(Continued)

FOREIGN PATENT DOCUMENTS

| | | |
|---|---|---|
| EP | 1310832 A2 | 5/2003 |
| EP | 1515134 A1 | 3/2005 |

(Continued)

OTHER PUBLICATIONS

U.S. Appl. No. 13/652,666, filed Oct. 16, 2012, Taichi Takemura.

(Continued)

*Primary Examiner* — Dung Tran
(74) *Attorney, Agent, or Firm* — Canon USA Inc IP Division

(57) ABSTRACT

An image forming apparatus includes an image forming unit configured to from a measurement image on a recording paper by a color material, a fixing unit configured to fix the measurement image onto the recording paper by heating, a measurement unit configured to measure the measurement image fixed onto the recording paper downstream of the fixing unit in a conveyance direction of the recording paper, and a control unit configured to perform control such that a period of time from when the recording paper passes through the fixing unit until the measurement unit measures color of the measurement image is longer than a period of time from when the recording paper passes through the fixing unit until the measurement unit measures density of the measurement image.

20 Claims, 12 Drawing Sheets

(56) References Cited

U.S. PATENT DOCUMENTS

| | | |
|---|---|---|
| 8,514,451 B2 | 8/2013 | Muto et al. |
| 8,639,148 B2 | 1/2014 | Kyung et al. |
| 2005/0196204 A1 | 9/2005 | Funato et al. |
| 2007/0196119 A1 | 8/2007 | Fujita |
| 2009/0154944 A1 | 6/2009 | Kawaguchi |
| 2009/0296085 A1 | 12/2009 | Mestha |
| 2010/0054769 A1 | 3/2010 | Adiletta et al. |
| 2010/0074663 A1 | 3/2010 | Ichikawa |
| 2010/0183326 A1 | 7/2010 | Bradley et al. |
| 2010/0201061 A1 | 8/2010 | Zirilli et al. |
| 2011/0052246 A1 | 3/2011 | Kyung et al. |
| 2011/0058823 A1* | 3/2011 | Hirai ................... 399/15 |
| 2011/0222927 A1 | 9/2011 | Yamashina |
| 2012/0070215 A1 | 3/2012 | Murakami et al. |
| 2013/0094040 A1 | 4/2013 | Tomii |
| 2013/0243451 A1* | 9/2013 | Hirota et al. ................ 399/39 |
| 2014/0105627 A1 | 4/2014 | Fujiwara |

FOREIGN PATENT DOCUMENTS

| | | |
|---|---|---|
| EP | 2000860 A1 | 12/2008 |
| JP | 2004-086013 A | 3/2004 |
| RU | 2378675 C2 | 1/2010 |

OTHER PUBLICATIONS

U.S. Appl. No. 13/688,087, filed Nov. 28, 2012, Tomohisa Itagaki.

* cited by examiner

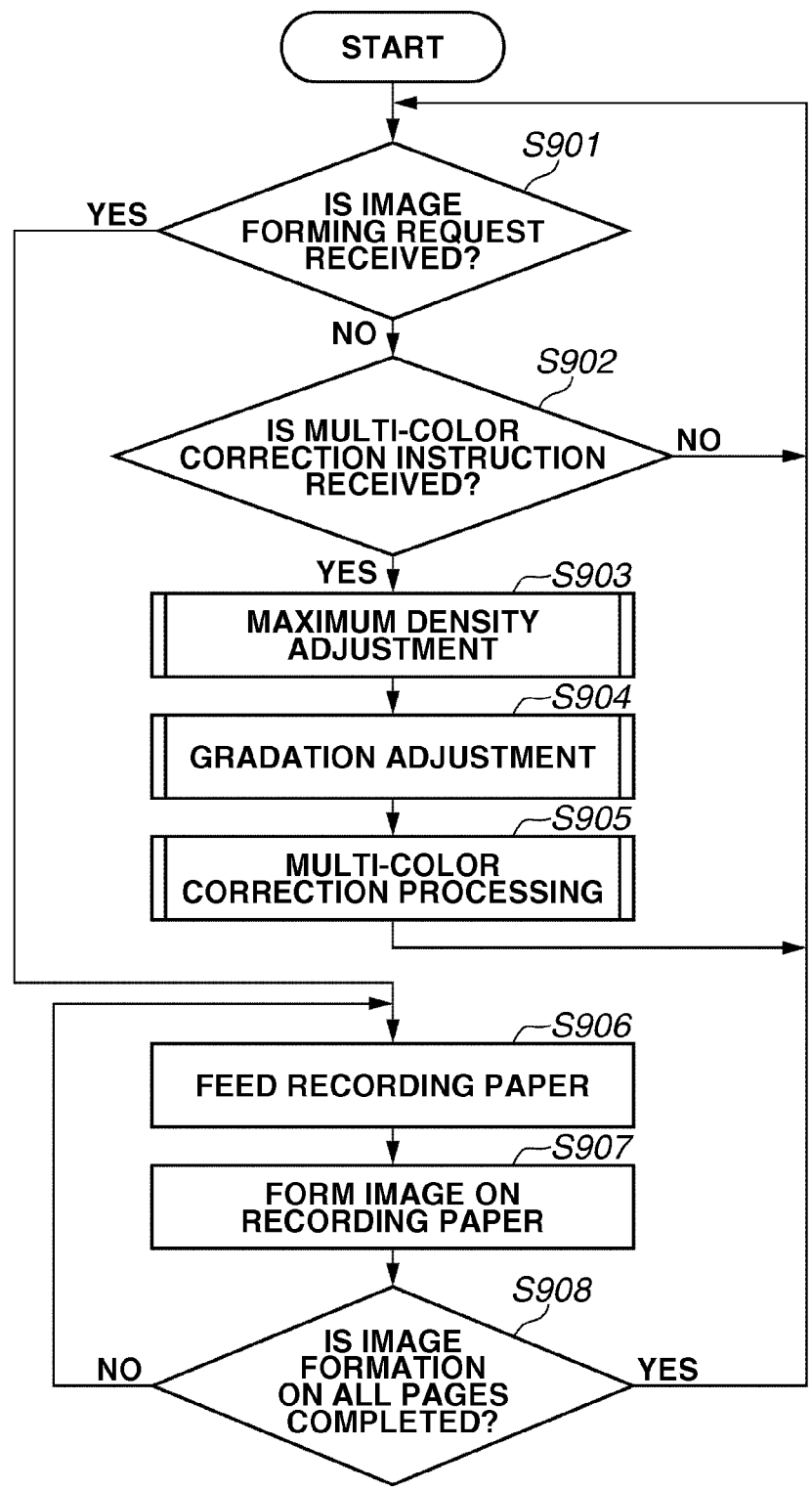

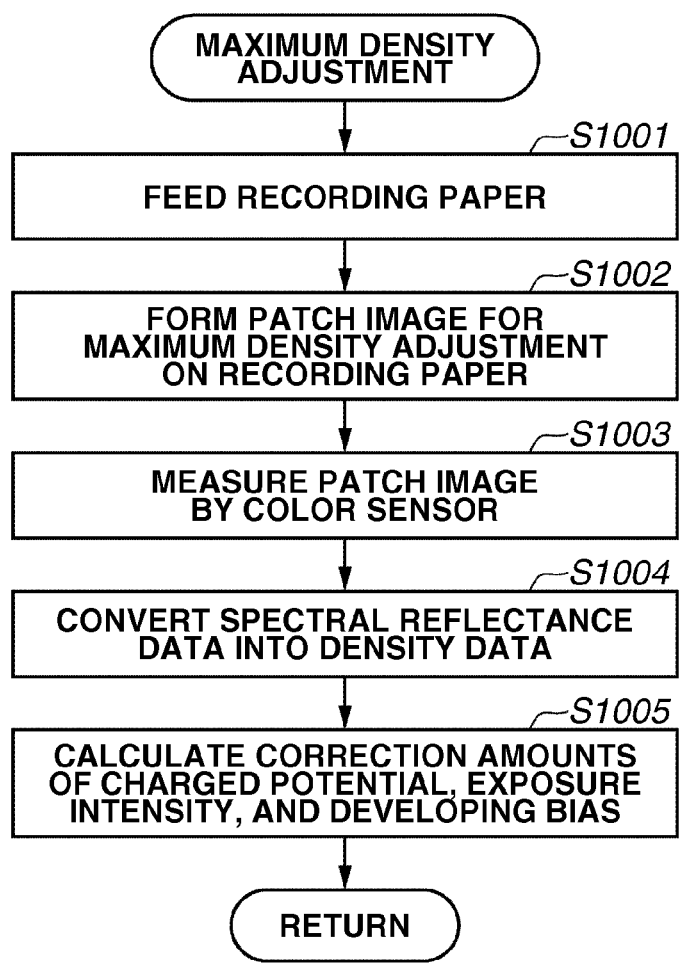

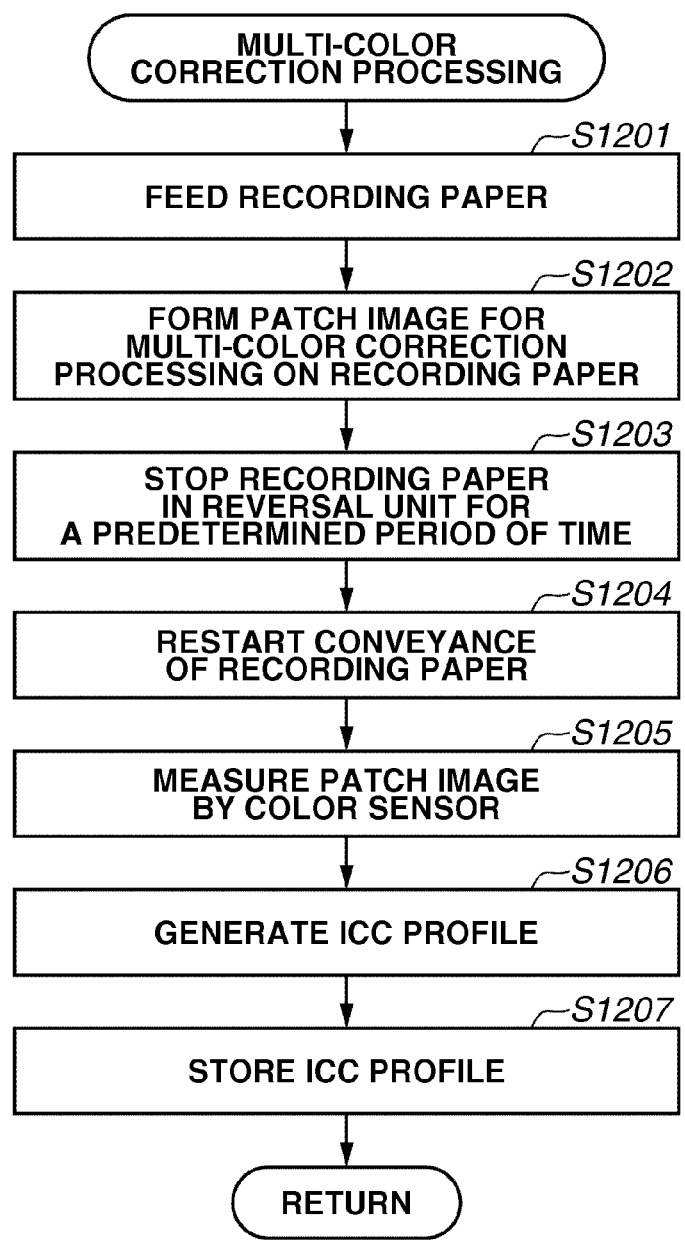

IMAGE FORMING APPARATUS FOR MEASURING FIXED IMAGE

BACKGROUND OF THE INVENTION

1. Field of the Invention

The present invention relates to an image forming apparatus having a colorimetric function.

2. Description of the Related Art

In an image forming apparatus, the quality of an image is determined based on graininess, in-plane uniformity, character quality, and color reproducibility (including color stability). In the recent spreading of the multi-color image forming apparatus, the color reproducibility is sometimes referred to as the most material factor for determining the quality of an image.

Each person has a memory of colors (e.g., specifically, colors of human skin, blue sky, and metal) he expects based on his experience. The person will have an uncomfortable feeling when seeing a color beyond a permissible range of the color he expects. Such colors are called "memory colors". The reproducibility of the memory colors are often expected when photographs are output.

A demand for a good color reproducibility (including color stability) is increasing with respect to the image forming apparatus. For example, in addition to the photo-images, there are office users who have uncomfortable feeling of difference in colors between a document image on a monitor and an actual document, and graphic art users for whom the color reproducibility of a computer-generated (CG) image is of paramount importance.

To satisfy the good color reproducibility demanded by the users, for example, Japanese Patent Application Laid-Open No. 2004-086013 discusses an image forming apparatus for scanning a measurement image (i.e., a patch image) formed on a recording paper by using a color sensor provided in a conveyance path for conveying the recording paper.

In the image forming apparatus, the measurement image is formed on the recording paper by using toners, and a scanning result of the measurement image measured by the color sensor is fed back to processing conditions such as an amount of exposure and developing bias, thereby enabling reproduction of density, gradation, and a tint to some extent.

However, in the image forming apparatus discussed in Japanese Patent Application Laid-Open No. 2004-086013, the color sensor is disposed in the conveyance path in the vicinity of a fixing device, and chromaticity of the measurement image as a measuring object varies according to a temperature. This phenomenon is called "thermochromism". The "thermochromism" is induced such that a molecular structure forming a color material such as toner and ink is changed according to "heat". Note, in the description below, the word "chromaticity" is just being used to express color. A particular chromaticity value may be expressed in the L*a*b color space. Other color spaces may be used without going beyond the scope and spirit of the invention as recited in the claims. Also, the "chromaticity value" is equivalent to the "color value".

In order to measure a color of the measurement image within the image forming apparatus, the color measurement is to be performed after the color material is placed on the recording paper and in a state where the color materials are mixed on the recording paper. In the image forming apparatus using inks as color materials, the color is required to be measured after the color materials are dried by heat by using a drying device. In the image forming apparatus using toners as the color materials, the color is required to be measured after the toners are heated and fused to be mixed by a fixing device. Therefore, the color sensor needs to be placed downstream of the drying device and the fixing device in a conveyance direction for conveying a recording paper.

On the other hand, in order to form the image forming apparatus in a compact size, a length of the conveyance path from the drying device and the fixing device to the color sensor needs to be as short as possible. Therefore, the recording paper and the color materials heated by the drying device and the fixing device are conveyed to the color sensor without being cooled to a room temperature. A temperature of the recording paper becomes higher than the room temperature due to a temperature rise in members within the image forming apparatus such as a conveyance guide of the recording paper or an atmospheric temperature rise within the image forming apparatus.

As described above, in the image forming apparatus equipped with the color sensor therein, a colorimetric measurement result which is different from the chromaticity under normal environment (i.e., under room-temperature environment) may be obtained due to an adverse effect of the thermochromism.

SUMMARY OF THE INVENTION

An example of the present invention is directed to an image forming apparatus capable of precisely detecting chromaticity (color) of a measurement image by decreasing a chromaticity (color) variation caused due to an adverse effect of thermochromism.

According to an aspect of the present invention, an image forming apparatus includes an image forming unit configured to form a measurement image on a recording paper by using a color material, a fixing unit configured to fix the measurement image onto the recording paper by heating the measurement image, a measurement unit configured to measure the measurement image fixed on the recording paper downstream of the fixing unit in a conveyance direction for conveying the recording paper, and a control unit configured to perform control such that a period of time from when the recording paper passes through the fixing unit until the measurement unit measures color of the measurement image becomes longer than a period of time from when the recording paper passes through the fixing unit until the measurement unit measures density of the measurement image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a flow chart illustrating an operation of the image forming apparatus.

FIG. 10 is a flow chart illustrating an operation of a maximum density adjustment.

FIG. 12 is a flow chart illustrating an operation of multi-color correction processing.

DETAILED DESCRIPTION OF THE EMBODIMENTS

Various exemplary embodiments, features, and aspects of the invention will be described in detail below with reference to the drawings.

In the exemplary embodiment of the present invention, a solution of the above described problem is described below employing an electrophotographic laser beam printer as an example. An electrophotographic method is employed here as an example of an image forming method. However, the exemplary embodiment of the present invention is also applicable to an ink jet method and a sublimation method. That is, the exemplary embodiment of the present invention is effective in the image forming apparatus in which the thermochromism phenomenon can occur. In the thermochromism phenomenon, the chromaticity of a measuring object varies according to a temperature. The ink jet method uses an image forming unit for forming an image on a recording paper by discharging ink and a fixing unit (i.e., a drying unit) for drying the ink.

Figure 1:
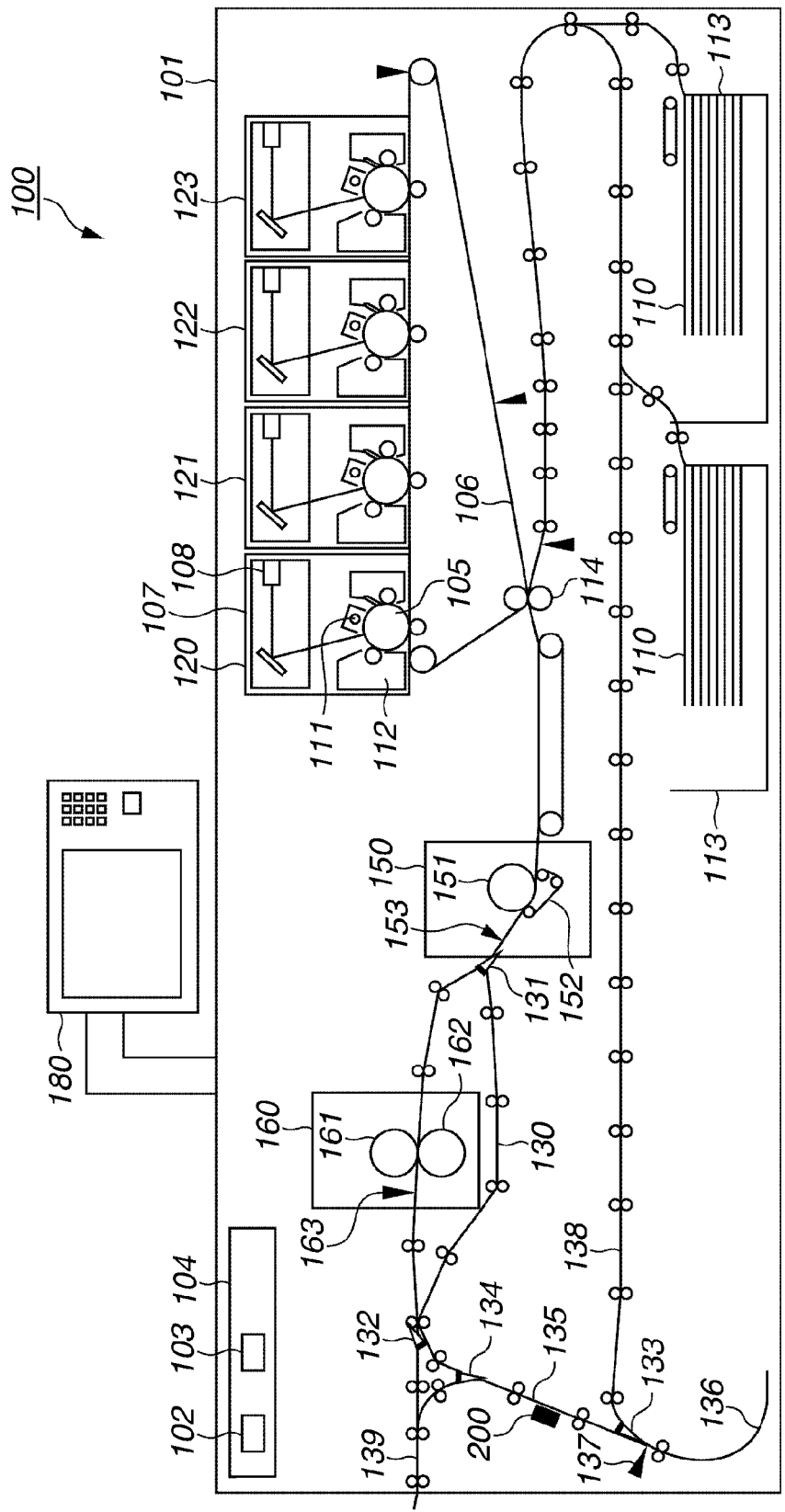
FIG. 1 is a cross sectional view illustrating a configuration of an image forming apparatus according to an exemplary embodiment of the present invention.

FIG. 1 is a cross sectional view illustrating a configuration of an image forming apparatus 100. The image forming apparatus 100 includes a housing 101. The housing 101 includes mechanisms for constituting an engine unit and a control board containing unit 104. The control board containing unit 104 includes an engine control unit 102 configured to control print process processing (e.g., paper feeding processing) performed by each mechanism and a printer controller 103.

As illustrated in FIG. 1, the engine unit is provided with four stations 120, 121, 122, and 123 corresponding to colors of yellow (Y), magenta (M), cyan (C), and black (K), respectively. The stations 120, 121, 122, and 123 are image forming units for forming an image by transferring toners onto a recording paper 110. The colors of yellow, magenta, cyan, and black are abbreviated to Y, M, C, and K, respectively. Each of the stations 120, 121, 122, and 123 is made of almost the same parts. A photosensitive drum 105 of each station is a kind of an image carrier and is uniformly charged with a surface potential by a corresponding primary charging device 111. Each photosensitive drum 105 is provided with a latent image formed thereon by laser light output from a corresponding laser 108. Each development unit 112 forms a toner image by developing the latent image by using a color material (i.e., toner). The toner image (i.e., a visible image) is transferred onto an intermediate transfer member 106. The visible image formed on the intermediate transfer member 106 is further transferred onto a recording paper 110 conveyed from any one of storage units 113 by using a transfer roller pair 114.

A fixing process mechanism according to the present exemplary embodiment includes a primary fixing device 150 and a secondary fixing device 160 for heating and pressurizing thus transferred toner image onto the recording paper 110 to be fixed to the recording paper 110. The primary fixing device 150 includes a fixing roller 151 for heating the recording paper 110, a pressure belt 152 for causing the recording paper 110 to be in pressure-contact with the fixing roller 151, and a first post fixing sensor 153 for detecting a completion of fixing of the toner image. Each of the rollers is a hollow roller and includes a heater therein.

A secondary fixing device 160 is disposed downstream of the primary fixing device 150 in a conveyance direction of the recording paper 110. The secondary fixing device 160 adds gloss to the toner image fixed by the primary fixing device 150 onto the recording paper 110 and secures fixity of the toner image. The secondary fixing device 160 also includes, as similar to the primary fixing device 150, a fixing roller 161, a pressure roller 162, and a second post fixing sensor 163. According to a type of the recording paper 110, the recording paper 110 is not required to be passed through the secondary fixing device 160. In this case, the recording paper 110 passes through a conveyance path 130 without going through the secondary fixing device 160 for the purpose of saving energy consumption.

For example, in a case where a setting is made so as to add more gloss onto the recording paper 110 or in a case where more heating energy is required in fixing the toner image onto the recording paper 110 which is thicker than the usual paper (i.e., a thick paper), the recording paper 110 having passed through the primary fixing device 150 is conveyed to the secondary fixing device 160. On the other hand, in a case where the recording paper 110 is a plain paper or a thin paper and in a case where the setting to add more gloss to the toner image is not made, the recording paper 110 is conveyed through the conveyance path 130 which detours around the secondary fixing device 160. A flapper 131 controls whether the recording paper 110 is to be conveyed to the secondary fixing device 160 or to be conveyed by detouring around the secondary fixing device 160.

A conveyance path switching flapper 132 serves as a leading member for leading the recording paper 110 to a paper discharge path 135 or leading the recording paper 110 to a paper discharge path 139 connected to the outside. The leading edge of the recording paper 110 guided to the paper discharge path 135 passes through a reversal sensor 137 to be conveyed to a reversal unit 136. When the reversal sensor 137 detects the trailing edge of the recording paper 110, the conveyance direction of the recording paper 110 is switched. The conveyance path switching flapper 133 serves as a leading member for leading the recording paper 110 to either one of the paper discharge path 135 and a conveyance path 138 for forming an image on both sides of the recording paper 110.

The paper discharge path 135 is provided with color sensors 200 for detecting a patch image on the recording paper 110. Four color sensors 200 are arranged in a direction orthogonal to the conveyance direction of the recording paper 110 and thus can detect four-column patch images. When a color detection command is received from an operation unit 180, the engine control unit 102 executes a maximum density adjustment, a gradation adjustment, and multi-color correction processing.

A conveyance path switching flapper 134 serves as a leading member for leading the recording paper 110 to the paper discharge path 139 connected to the outside. The recording paper 110 conveyed through the paper discharge path 139 is discharged to the outside of the image forming apparatus 100.

Figure 2:
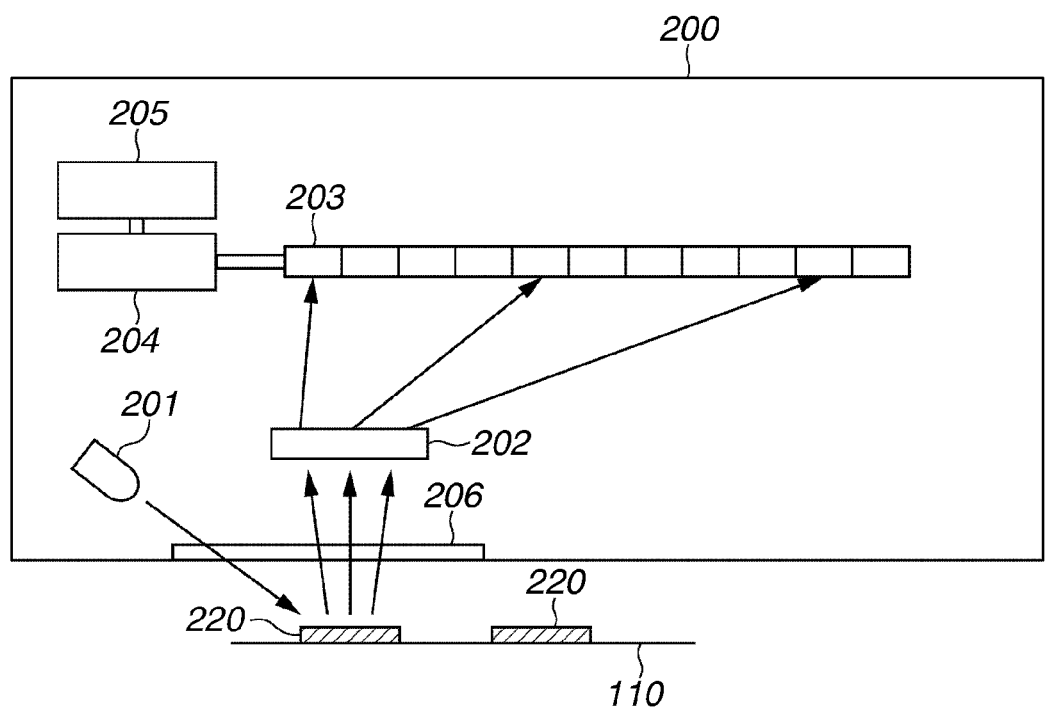
FIG. 2 illustrates a configuration of a color sensor.

FIG. 2 illustrates a configuration of a color sensor 200. Each of the color sensors 200 includes a white light-emitting diode (LED) 201, a diffraction grating 202, a line sensor 203, a calculation unit 204, and a memory 205 therein. The white LED 201 is a light emission element for irradiating light onto a patch image 220 on the recording paper 110. The diffraction grating 202 divides light reflected from the patch image 220 by wavelength. The line sensor 203 is a photo-detection element including the n number of light-sensitive elements for detecting light divided by wavelength by the diffraction grating 202. The calculation unit 204 performs various calculations based on a light intensity value of each pixel detected by the line sensor 203.

A memory 205 stores various types of data used by the calculation unit 204. The calculation unit 204 includes, for example, a spectral calculation unit which performs a spectral calculation based on the light intensity value and a Lab calculation unit which calculates a Lab value. The calculation unit 204 may further include a lens 206 which condenses light irradiated from the white LED 201 onto the patch image 220 on the recording paper 110 and condenses light reflected from the patch image 220 onto the diffraction grating 202.

Figure 3:
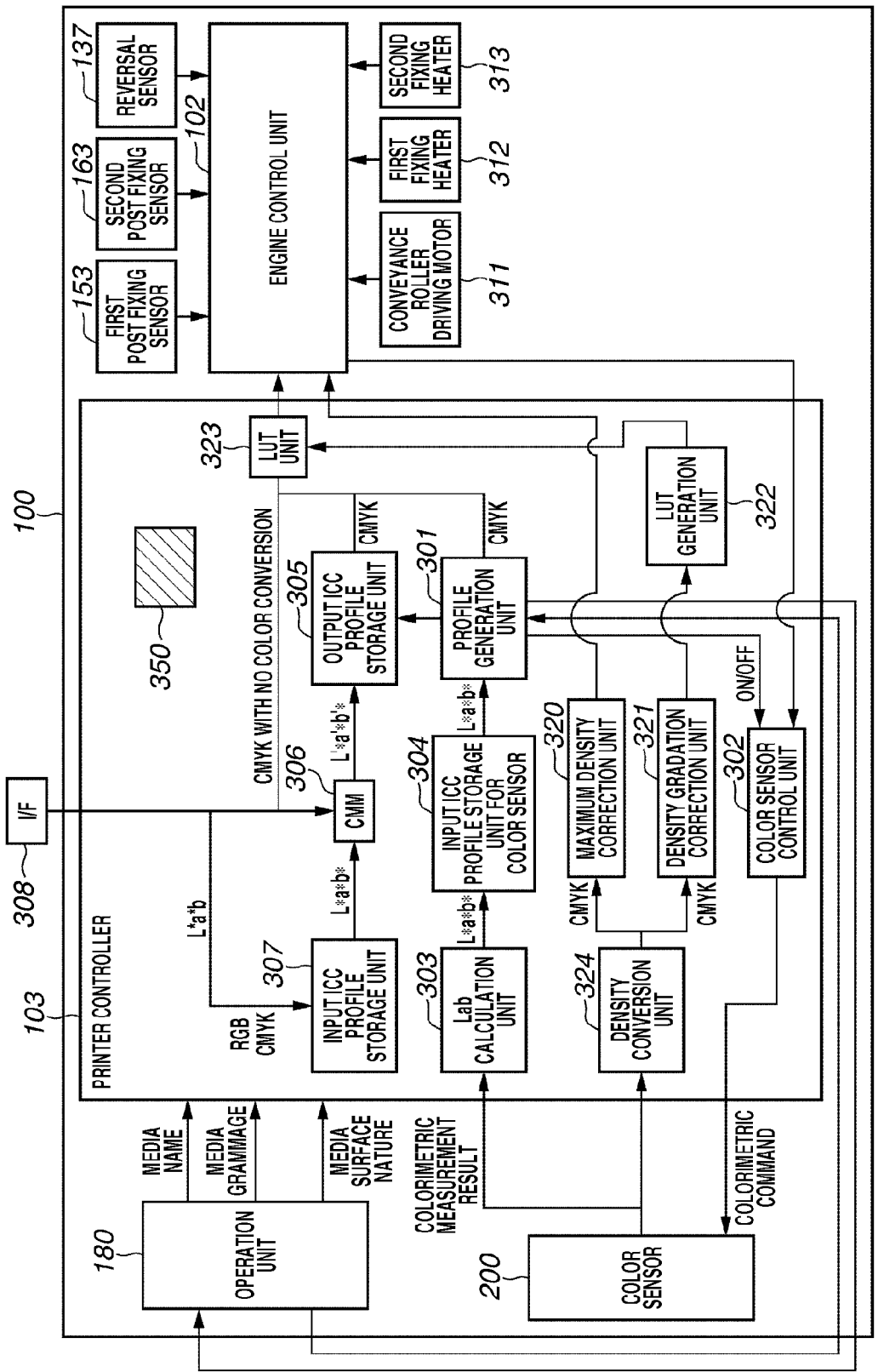
FIG. 3 is a block diagram illustrating a system configuration of the image forming apparatus.

FIG. 3 is a block diagram illustrating a system configuration of the image forming apparatus 100. The maximum density adjustment, the gradation adjustment, and the multi-color correction processing are described below with reference to FIG. 3.

A printer controller 103 instructs an engine control unit 102 to output a test chart to be used in the maximum density adjustment. At the time, the patch image 220 for adjusting the maximum density is formed on the recording paper 110 according to charged potential, exposure intensity, and developing bias set preliminary or set at the time of the last maximum density adjustment. Then, the engine control unit 102 instructs a color sensor control unit 302 to measure colors of the patch image 220.

When the colors of the patch image 220 are measured by the color sensors 200, a result of the color measurement is transmitted to a density conversion unit 324 as spectral reflectance data. The density conversion unit 324 converts the spectral reflectance data into density data of the colors of cyan (C), magenta (M), yellow (Y), and black (K) and transmits the converted density data to a maximum density correction unit 320.

The maximum density correction unit 320 calculates correction amounts for the charged potential, the exposure intensity, and the developing bias such that the maximum density of the output image becomes a desired value, and transmits the calculated correction amounts to the engine control unit 102. The engine control unit 102 uses the received correction amounts for the charged potential, the exposure intensity, and the developing bias on and after the next image forming operation. According to the above operation, the maximum density of the output image is adjusted.

When the maximum density adjustment is completed, the printer controller 103 instructs the engine control unit 102 to form a 16-gradation patch image on the recording paper 110. Examples of an image signal of the 16-gradation patch image may include 00H, 10H, 20H, 30H, 40H, 50H, 60H, 70H, 80H, 90H, A0H, B0H, C0H, D0H, E0H, and FFH.

At the time, the 16-gradation patch image is formed on the recording paper 110 by using the correction amounts for the charged potential, the exposure intensity, and the developing bias calculated in the maximum density adjustment. When the 16-gradation patch image is formed on the recording paper 110, the engine control unit 102 instructs the color sensor control unit 302 to measure the colors of the patch image 220.

When the colors of the patch image 220 are measured by the color sensors 200, a result of the color measurement is transmitted to the density conversion unit 324 as the spectral reflectance data. The density conversion unit 324 converts the spectral reflectance data into density data of the colors of cyan (C), magenta (M), yellow (Y), and black (K), and transmits the converted density data to a density gradation correction unit 321. The density gradation correction unit 321 calculates a correction amount for an exposure amount such that a desired gradation can be obtained. A look up table (LUT) generation unit 322 generates a monochromatic gradation LUT and transmits the monochromatic gradation LUT to a LUT unit 323 as a signal value of each of the colors of cyan (C), magenta (M), yellow (Y), and black (K).

Upon performing the multi-color correction processing, the image forming apparatus 100 generates a profile based on a detection result of the patch image 220 including multiple colors, and converts an input image by using the profile to form an output image thereof. An International Color Consortium (ICC) profile which has recently been accepted in the market is used here as an example of the profile for realizing an excellent color reproducibility. The present exemplary embodiment, however, can also be applied to Color Rendering Dictionary (CRD) employed from PostScript Level 2 proposed by Adobe Systems Incorporated, and a color separation table with Adobe Photoshop, in addition to the ICC profile.

When a customer engineer exchanges parts, or when a user executes a job requiring a color matching accuracy or desires to know a tint of a final output in his design conceptual phase, the engineer or user operates the operation unit 180 to instruct generation of a color profile.

The printer controller 103 performs the profile generation processing. The printer controller 103 includes a central processing unit (CPU) which reads out a program for executing a below-described flow chart from a storage unit 350 to run the program. For the sake of easy understanding of the processing performed by the printer controller 103, FIG. 3 illustrates an interior configuration of the printer controller 103 in a block diagram.

When the operation unit 180 receives a profile generation command, a profile generation unit 301 outputs a CMYK color chart 210 as an International Organization for Standardization (ISO) 12642 test form on the engine control unit 102 without using the profile. The profile generation unit 301 transmits a color measurement command to a color sensor control unit 302. The engine control unit 102 controls the image forming apparatus 100 to cause the image forming apparatus 100 to execute a charge processing, an expose processing, a development processing, a transfer processing, and a fixing processing. Accordingly, the ISO12642 test form is formed on the recording paper 110. The color sensor control unit 302 controls the color sensors 200 so as to measure the colors of the ISO12642 test form. The color sensors 200 output the spectral reflectance data resulting from a colorimetric measurement on a Lab calculation unit 303 of the printer controller 103. The Lab calculation unit 303 converts the spectral reflectance data into L*a*b* data to output the L*a*b* data on the profile generation unit 301. The Lab calculation unit 303 may convert the spectral reflectance data into a Commission Internationale de l'Eclairage (CIE) 1931XYZ color specification system having a device-independent color space signal.

The profile generation unit 301 generates an output ICC profile based on a relationship between CMYK color signals output on the engine control unit 102 and the L*a*b* data input from the Lab calculation unit 303. The profile generation unit 301 stores thus generated output ICC profile replacing the output ICC profile currently stored in the output ICC profile storage unit 305.

The ISO12642 test form includes patches of color signals of the colors C, M, Y, and K covering a color reproduction range where a typical copy machine can output. Thus, the profile generation unit 301 creates a color conversion table based on a relationship between a color signal value of each of the colors and the measured L*a*b* data value. More specifically, a conversion table for converting color signals of the colors C, M, Y and K into the Lab value is generated. A reverse conversion table is generated based on the conversion table.

When the profile generation unit 301 receives a profile generation command from a host computer via an interface (I/F) 308, the profile generation unit 301 outputs the generated output ICC profile on the host computer via the I/F 308. The host computer can execute the color conversion corresponding to the ICC profile with an application program.

In the color conversion in a normal color output, an image signal which is input from a scanner unit via the I/F 308 on the assumption of RGB (Red, Green, Blue) signal values and CMYK signal values in standard printing colors such as JapanColor, is transmitted to an input ICC profile storage unit 307 which receives input from external devices. The input ICC profile storage unit 307 converts the RGB signals into the L*a*b* data or the CMYK signals into the L*a*b* data according to the image signal input via the I/F 308. The input ICC profile stored in the input ICC profile storage unit 307 includes a plurality of LUTs (look up tables).

Examples of the LUTs include a one-dimensional LUT for controlling a gamma value of the input signal, a multi-color LUT called as a direct mapping, and a one-dimensional LUT for controlling the gamma value of thus generated conversion data. The input image signal is converted from a color space dependent on a device into the L*a*b* data independent from the device with the LUTs.

The image signal converted into L*a*b* color space coordinates is input into a color management module (CMM) 306. The CMM 306 executes various types of color conversions. For example, the CMM 306 executes a gamut conversion in which mapping of a mismatch is performed between a reading color space such as a scanner unit as an input device and an output color reproduction range of the image forming apparatus 100 as an output device. The CMM 306 further executes a color conversion for adjusting a mismatch between a type of light source at the time of input and a type of light source at the time of observing an output object (the mismatch is also referred to as a mismatch of a color temperature setting).

As described above, the CMM 306 converts the L*a*b* data into L'*a'*b'* data to output the converted data on an output ICC profile storage unit 305. A profile generated according to the color measurement is stored in the output ICC profile storage unit 305. Thus, the output ICC profile storage unit 305 performs a color conversion of the L'*a'*b'* data by using a newly generated ICC profile to further convert the resulting data into the signals of the colors C, M, Y, and K dependent on an output device.

The LUT unit 323 corrects gradation of the signals of the colors C, M, Y, and K by means of the LUT set by the below-described LUT generation unit 322. The signals of the colors C, M, Y, and K of which gradation is corrected are output to the engine control unit 102.

Figure 4:
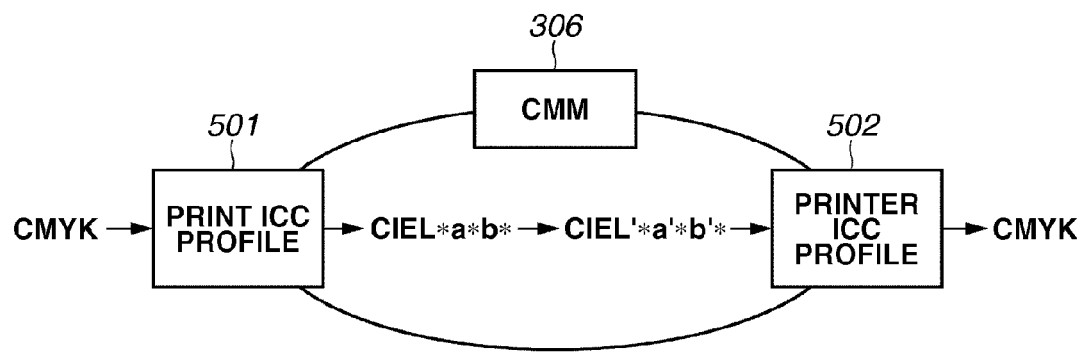
FIG. 4 is a schematic view illustrating a color management environment.

In FIG. 3, the CMM 306 is separated from an input ICC profile storage unit 307 and an output ICC profile storage unit 305. However, as illustrated in FIG. 4, the CMM 306 includes a module for performing a color management. In other words, the CMM 306 performs a color conversion by using an input profile (i.e., a print ICC profile 501) and an output profile (i.e., a printer ICC profile 502).

Figure 5:
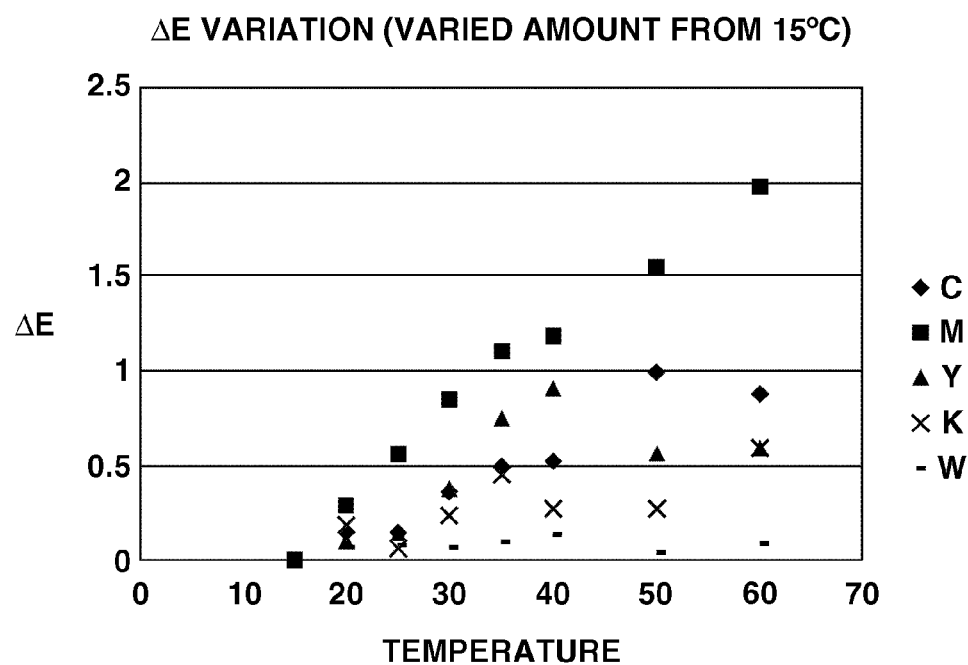
FIG. 5 illustrates a trend of a chromaticity variation per color material.

A thermochromism characteristic per color is described below. As a molecular structure forming a color material such as toner and ink varies by heat, a reflection absorption characteristic of light varies and the chromaticity changes. As a result of a verification of a test, it is found that a trend of the chromaticity change differs between color materials as illustrated in FIG. 5. A horizontal axis of the graph of FIG. 5 indicates a temperature variation of the patch image 220, and a vertical axis of the graph of FIG. 5 indicates a chromaticity variation ΔE relative to a reference value at the temperature 15° C.

ΔE can be indicated by a three dimensional distance expressed in the following equation between two points (L1, a1, b1) and (L2, a2, b2) within the L*a*b* color space established by CIE.

$$\Delta E = \sqrt{(L1-L2)^2 + (a1-a2)^2 + (b1-b2)^2}$$

FIG. 5 illustrates a case of cyan (C) 100%, magenta (M) 100%, yellow (Y) 100%, black (K) 100%, and white paper (W). As illustrated in FIG. 5, the variation in a case of magenta is particularly great. The higher the temperature of the patch image 220 becomes, the greater the chromaticity of the patch image 220 varies. As a result thereof, a deviation occurs in the ICC profile to be generated.

As an index of color matching accuracy and color stability, the color matching accuracy standard established by ISO 12647-7 (i.e., IT8.7/4 (ISO 12642:1617 patch) [4.2.2]) defines that an average of ΔE is 4.0. The color reproducibility [4.2.3] as a standard of the color stability defines that ΔE is equal to or less than 1.5 (i.e., ΔE≤1.5) in each patch. To satisfy the conditions, it is desired that detection accuracy for ΔE of the color sensors 200 is equal to or less than 1.0 (i.e., ΔE≤1.0). As illustrated in FIG. 5, to realize ΔE≤1.0 in all the colors Y, M, C, and K, a temperature of the patch image 220 is required to be lowered to a value equal to or less than 34° C.

Figure 6:
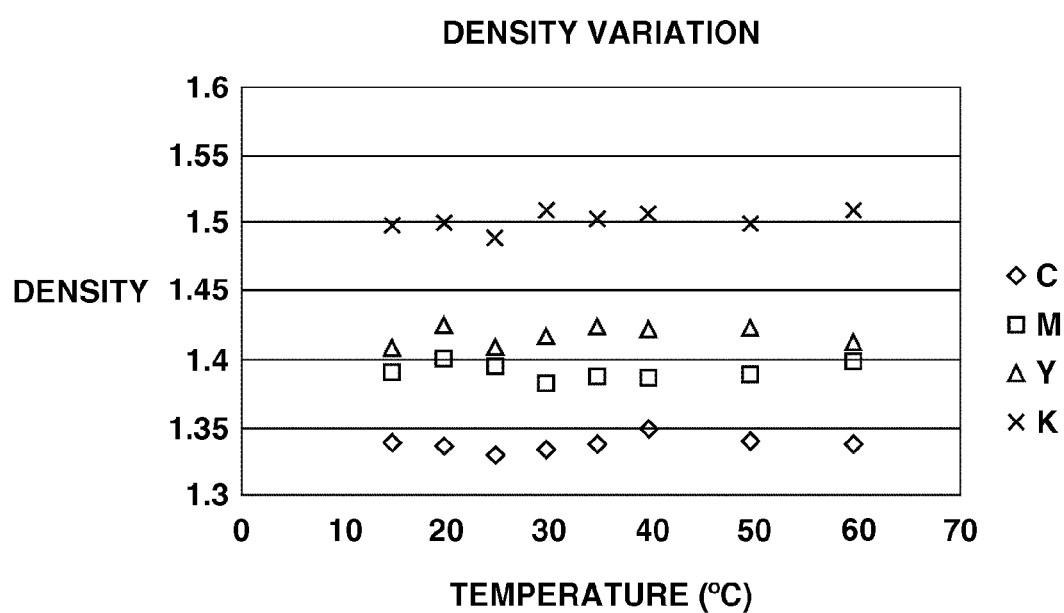
FIG. 6 illustrates a trend of density variation per color material.

As described above, the chromaticity value (i.e., Lab value) varies with respect to a temperature. On the other hand, as a result of a study by the present applicant, it is found that a density value hardly varies even while the temperature varies, i.e., there is no correlation between the density value and the temperature. The result thereof is illustrated in FIG. 6.

The phenomenon that the chromaticity value varies but the density value does not vary according to the temperature variation can be described based on differences in calculation methods upon calculation to obtain an area in which the spectral reflectance varies, a chromaticity value, and a density value. The above-described phenomenon is described below by exemplifying the color of magenta (M) having a larger chromaticity variation ΔE with respect to the temperature variation.

Figure 7A:
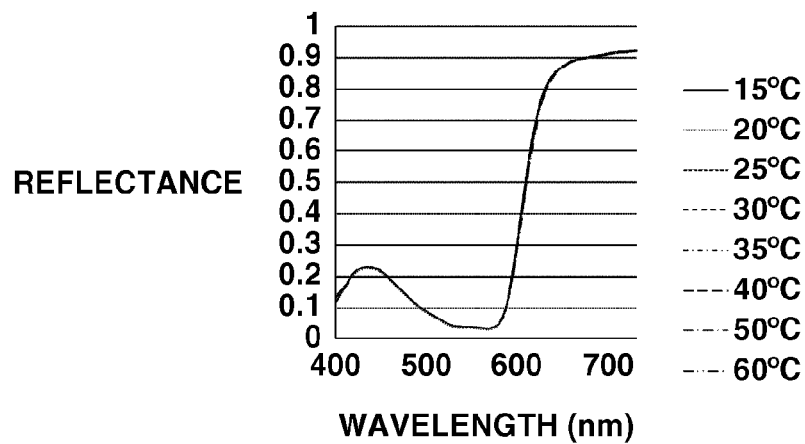
FIGS. 7A, 7B, and 7C each illustrate spectral reflectance data in different temperatures when a color of a magenta patch image is measured by a color sensor.
Figure 7B:
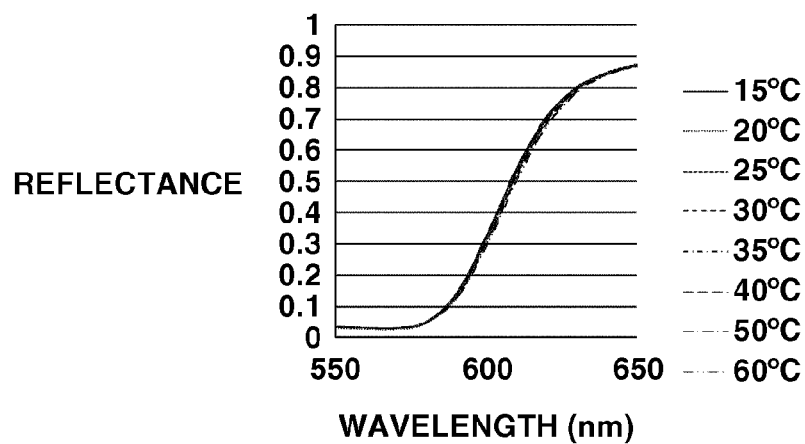
Figure 7C:
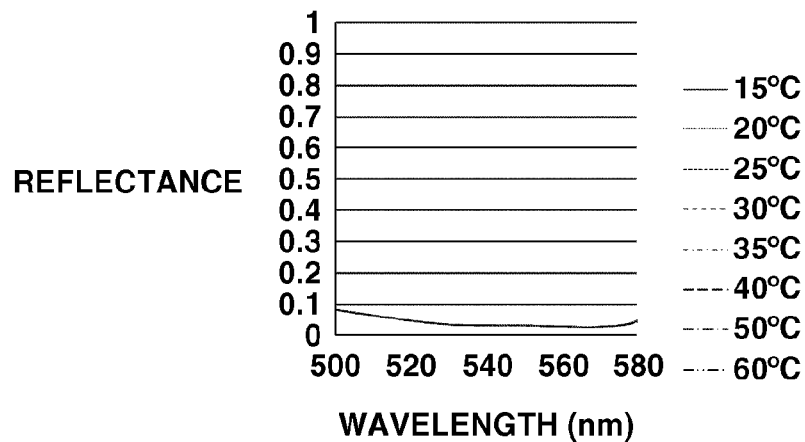

FIGS. 7A, 7B, and 7C illustrate spectral reflectance data in different temperatures when the patch image 220 in magenta is measured by the color sensors 200. FIG. 7A is an enlarged view of the entire wavelength area of a range between 400 nm and 700 nm. FIG. 7B is an enlarged view of a wavelength area of a range between 550 nm and 650 nm. FIG. 7C is an enlarged view of a wavelength area of a range between 500 nm and 580 nm.

As illustrated in FIG. 5, in a case where a temperature of the patch image 220 changes from 15° C. to 60° C., the chromaticity variation ΔE of magenta becomes about 2.0. The value of the chromaticity variation ΔE is obtained based on the variation of the spectral reflectance. FIG. 7B illustrates that the spectral reflectance varies according to the temperature variation of the patch image 220. That is, the Lab calculation unit 303 calculates the chromaticity by using a spectral reflectance with respect to the entire wavelength area, so that the chromaticity value varies as the spectral reflectance varies.

On the other hand, as illustrated in FIG. 6, the density hardly varies while the temperature of the patch image 220 varies from 15° C. to 60° C. That is, the density conversion unit 324 calculates the density by using the spectral reflectance with respect to a specific wavelength area. A variation of the spectral reflectance is not clearly illustrated in FIG. 7A. However, in FIG. 7B illustrating the enlarged wavelength area of a range between 550 nm and 650 nm, a state where the variation of the temperature of the patch image 220 causes the variation of the spectral reflectance is clearly illustrated. That is, since the Lab calculation unit 303 calculates the chromaticity by using the spectral reflectance with respect to the entire wavelength area, the chromaticity value varies as the spectral reflectance varies.

Figure 8A:
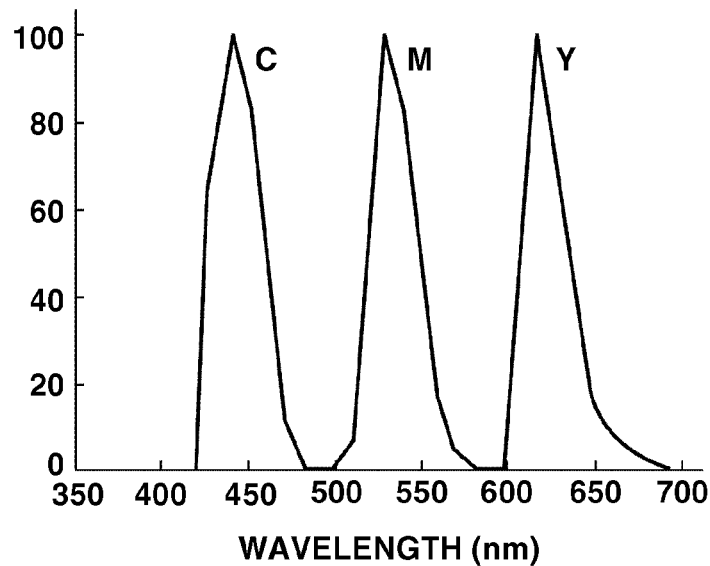
FIGS. 8A and 8B illustrate a filter sensitivity characteristic to be used in density arithmetic processing.
Figure 8B:
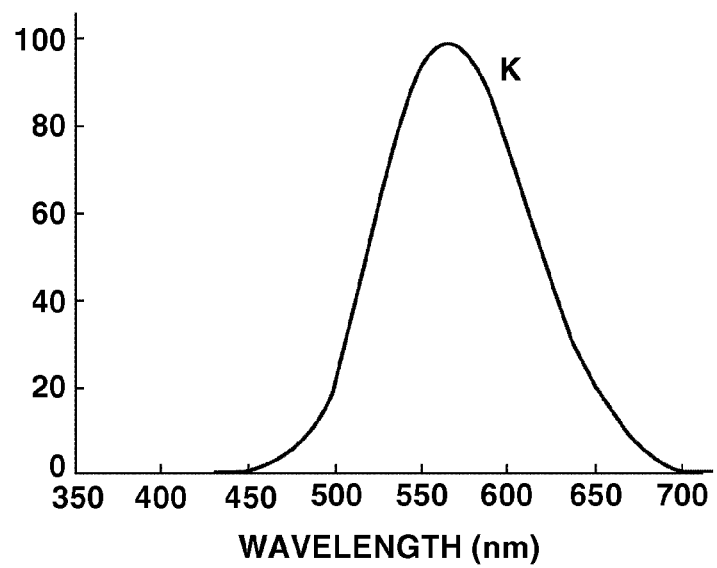

That is, the density conversion unit 324 calculates the density by using the spectral reflectance with respect to a specific wavelength area. More specifically, the density conversion unit 324 converts the spectral reflectance data of the colors of cyan, magenta, and yellow into density data by using a filter illustrated in FIG. 8A. The density conversion unit 324 converts the spectral reflectance data of the color of black into density data by using a visibility spectral characteristic as illustrated in FIG. 8B.

It is understood that the spectral reflectance hardly varies in the wavelength area in FIG. 7C. The area of FIG. 7C corresponds to an area having a sensitivity characteristic of a color of green among the wavelength area of the horizontal axis illustrated in FIG. 8A. The density value of magenta is calculated by using the sensitivity characteristic of the color of green as a complementary color. Therefore, in this area, the spectral reflectance hardly varies even as the temperature varies, so that the density value hardly varies.

As described above, while the chromaticity of the patch image 220 varies according to the temperature variation, the density of the patch image 220 hardly varies according to the temperature variation. In the present exemplary embodiment, upon multi-color correction (i.e., upon generation of the ICC profile), the color measurement is to be performed by the color sensors 200 after allowing heat on the recording paper 110 heated by a fixing device to dissipate. However, when adjusting the maximum density or the gradation, the color measurement is to be performed by the color sensors 200 without allowing heat on the recording paper 110 to dissipate.

FIG. 9 is a flow chart illustrating an operation of the image forming apparatus 100. The flow chart is executed by the printer controller 103. In step S901, the printer controller 103 determines whether an image forming request is received from the operation unit 180 or whether the image forming request is received from the host computer via the I/F 308.

Figure 11:
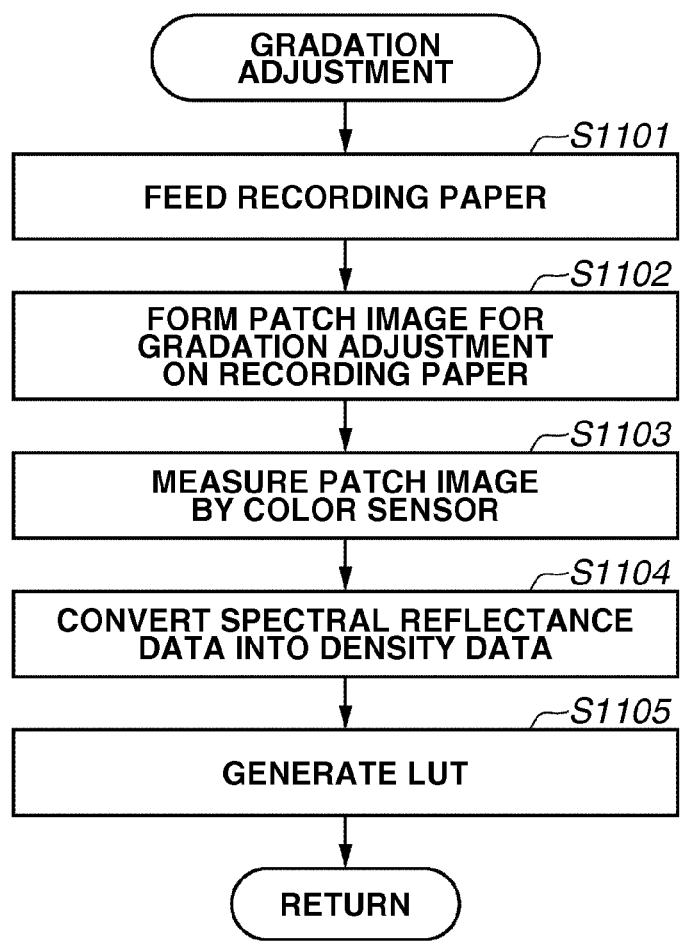
FIG. 11 is a flow chart illustrating an operation of a gradation adjustment.

In step S902, if no image forming request is received (NO in step S902), the printer controller 103 determines whether a multi-color correction command is received from the operation unit 180. If the multi-color correction command is received (YES in step S902), then in step S903, the printer controller 103 performs the maximum density adjustment in a manner as illustrated in FIG. 10. In step S904, the printer controller 103 further performs the gradation adjustment in a manner as illustrated in FIG. 11. In step S905, the printer controller 103 still further performs multi-color correction processing in a manner as illustrated in FIG. 12. If, in step S902, no multi-color correction command is received (NO in step S902), the processing returns to step S901. As described above, the maximum density adjustment and the gradation adjustment are performed before the multi-color correction processing in order to achieve highly accurate multi-color correction processing.

If, in step S901, the printer controller 103 determines that an image forming request is received (YES in step S901), then in step S906, the printer controller 103 causes the storage unit 113 to feed the recording paper 110, to form a toner image on the recording paper 110 in step S907. In step S908, the printer controller 103 determines whether an image formation is completed for all the pages. If the image formation is completed for all the pages (YES in step S908), the processing returns to step S901. If the image formation is not completed for all the pages (NO in step S908), the processing returns to step S906 to form the image formation for the next page.

FIG. 10 is a flow chart illustrating an operation of the maximum density adjustment. The flow chart is executed by the printer controller 103. The image forming apparatus 100 is controlled by the engine control unit 102 according to an instruction from the printer controller 103.

In step S1001, the printer controller 103 causes the storage unit 113 to feed the recording paper 110, to form a patch image 220 on the recording paper 110 for the maximum density adjustment in step S1002. Subsequently, in step S1003, the printer controller 103 causes the color sensors 200 to measure the patch image 220 when the recording paper 110 arrives at the color sensors 200.

In step S1004, the printer controller 103 causes the density conversion unit 324 to convert the spectral reflectance data output from the color sensors 200 into density data of the colors of C, M, Y, and K. In step S1005, the printer controller 103 calculates the correction amounts for the charged potential, the exposure intensity, and the developing bias based on the converted density data. The correction amounts calculated here are stored in the storage unit 350 to be used thereby.

FIG. 11 is a flow chart illustrating an operation of the gradation adjustment. The flow chart is executed by the printer controller 103. The image forming apparatus 100 is controlled by the engine control unit 102 according to a command from the printer controller 103.

In step S1101, the printer controller 103 causes the storage unit 113 to feed a recording paper 110, to form a patch image (i.e., a 16-gradation patch image) on the recording paper 110 for the gradation adjustment in step S1102. In step S1103, the printer controller 103 causes the color sensors 200 to measure the patch image 220 when the recording paper 110 arrives at the color sensors 200.

In step S1104, the printer controller 103 causes the density conversion unit 324 to convert the spectral reflectance data output from the color sensors 200 into density data of the colors Y, M, C, and K. In step S1105, the printer controller 103 calculates the correction amount for the exposure intensity based on thus converted density data, to generate a LUT for correcting the gradation in step S1105. The LUT calculated here is set in the LUT unit 323 to be used thereby.

FIG. 12 is a flow chart illustrating an operation of multi-color correction processing. The flow chart is executed by the printer controller 103. The image forming apparatus 100 is controlled by the engine control unit 102 according to a command from the printer controller 103.

In step S1201, the printer controller 103 causes the storage unit 113 to feed a recording paper 110, to form a patch image 220 on the recording paper 110 for the multi-color correction processing in step S1202. In step S1203, the printer controller 103 stops conveying the recording paper 110 by controlling a conveyance roller driving motor 311 when the trailing edge of the recording paper 110 is detected by a reversal sensor 137.

The printer controller 103 stops the recording paper 110 in a reversal unit 136 for a predetermined period of time (e.g., 40 sec. in the present exemplary embodiment) to allow heat on the patch image 220 on the recording paper 110 to dissipate. Accordingly, a chromaticity variation caused due to an adverse effect of the thermochromism can be decreased.

As illustrated in FIG. 5, the temperature of the patch image 220 is required to be lowered at a temperature equal to or less than 34° C. in order to realize ΔE values equal to or less than 1.0 (i.e., ΔE≤1.0) in all the colors Y, M, C, and K. A period of time required for this heat dissipation is set to 40 sec. in the present exemplary embodiment. While the recording paper 110 is stopped for 40 sec., the temperature of the patch image 220 can be decreased to a temperature equal to or less than 34° C., even in a case where both of a first fixing heater 312 provided on the primary fixing device 150 and a second fixing heater 313 provided on the secondary fixing device 160 are used.

After the stop time of 40 sec. has elapsed, in step S1204, the printer controller 103 controls the conveyance roller driving motor 311 to restart conveying the recording paper 110. At the time, the printer controller 103 conveys the recording paper 110 toward the color sensors 200 in the opposite direction.

In step S1205, when the recording paper 110 arrives at the color sensors 200, the printer controller 103 causes the color sensors 200 to measure the patch image 220 on the recording paper 110. The printer controller 103 calculates the chromaticity data (L*a*b*) based on the spectral reflectance data output from the color sensors 200 by using the Lab calculation unit 303. In step S1206, the printer controller 103 generates the ICC profile based on the chromaticity data (L*a*b*) according to the above-described processing, to store the resulting ICC profile in the output ICC profile storage unit 305 in step S1207.

As described above, in the present exemplary embodiment, the colors of the patch image 220 are measured by the color sensors 200 without providing the stop time for stopping the recording paper 110 in the maximum density adjustment and the gradation adjustment among the operations of the color correction processing. On the other hand, as illustrated in step S1203, in the multi-color correction processing, the recording paper 110 having passed through the fixing device is stopped for a predetermined period of time to allow heat on the recording paper 110 to dissipate as much as possible and thereafter to cause the color sensors 200 to measure the colors of the patch image 220.

In other words, in the present exemplary embodiment, a period of time, for calculating the chromaticity value by the Lab calculation unit 303, from when the recording paper 110 passes through the fixing device until the color measurement is performed by the color sensors 200, is controlled to be longer than the period of time for calculating the density value by the density conversion unit 324. Accordingly, in the present exemplary embodiment, the chromaticity variation caused due to the adverse effect of the thermochromism can be decreased in the multi-color correction processing, thereby enabling a highly accurate detection of the chromaticity of the patch image 220.

In the above description, the recording paper 110 is temporarily stopped before the color measurement is performed by the color sensors 200 after the recording paper 110 passes through the fixing device, thereby allowing heat on the recording paper 110 to dissipate. Instead of the temporal stopping of the recording paper 110, a conveyance speed to convey the recording paper 110 may be decreased.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-226024 filed Oct. 13, 2011, which is hereby incorporated by reference herein in its entirety.

What is claimed is:

1. An image forming apparatus comprising:
   a conveyance unit configured to convey a recording paper along a conveyance path;
   an image forming unit configured to form a measurement image on the recording paper by using at least one of color materials;
   a fixing unit configured to heat the measurement image on the recording paper and fix the measurement image onto the recording paper;
   a measurement unit configured to measure the measurement image fixed on the recording paper at a downstream position in a conveyance direction of the recording paper relative to the fixing unit in the conveyance path; and
   a controller configured to control the conveyance unit such that a first time period from a time point that the recording paper passes through the fixing unit to a time point that the measurement unit measures the color of the measurement image in the first measurement mode becomes longer than a second time period from a time point that the recording paper passes through the fixing unit to a time point that the measurement unit measures the density of the measurement image in the second measurement mode.

2. The image forming apparatus according to claim 1, wherein
   the controller is configured to cause the conveyance unit to stop conveying the recording paper at a predetermined time period in the first time period.

3. The image forming apparatus according to claim 2, wherein
   the controller is configured to change a length of time period during which the recording paper is stopped by the conveyance unit according to a type of the recording paper.

4. The image forming apparatus according to claim 3, wherein the length of the time period during which a first recording paper is stopped is longer than the length of the time period during which a second recording paper, which is thinner than the first recording paper, is stopped.

5. The image forming apparatus according to claim 1, wherein the controller is configured to control a conveyance speed at which the conveyance unit conveys the recording paper, and
   the conveyance speed at which the conveyance unit conveys the recording paper in the first time period is slower than the conveyance speed at which the conveyance unit conveys the recording paper in the second time period.

6. The image forming apparatus according to claim 5, wherein the controller is configured to change the conveyance speed at which the conveyance unit conveys the recording paper according to a type of the recording paper.

7. The image forming apparatus according to claim 6, wherein the conveyance speed at which the conveyance unit conveys the first recording paper is slower than the speed at which the conveyance unit conveys the second recording paper, which is thinner than the first recording paper.

8. The image forming apparatus according to claim 1, wherein the measurement unit comprises an irradiating unit configured to irradiate light onto the measurement image and a light receiving unit configured to receive reflection light from the measurement unit, the measurement unit is configured to generate spectral data of the measurement image based on a light receiving result of the light receiving unit, the measurement unit is configured to convert the generated spectral data into chromaticity data indicative of the color of the measurement image in the first measurement mode, and the measurement unit is configured to convert the generated spectral data into density data indicative of the density of the measurement image in the second measurement mode.

9. The image forming apparatus according to claim 8, wherein the measurement unit is configured to convert spectral data of a first wavelength area included in the generated spectral data into the chromaticity data in the first measurement mode, and the measurement unit is configured to convert spectral data of a second wavelength area included in the generated spectral data into the density data in the second measurement mode, the second wavelength area being narrower than the first wavelength area.

10. The image forming apparatus according to claim 9, wherein the second wavelength area corresponds to each one of the color materials.

11. The image forming apparatus according to claim 9, wherein the color materials include yellow, magenta, cyan, and black, and the measurement unit is configured to convert the generated spectral data into the density data using a conversion process corresponding to the color materials.

12. The image forming apparatus according to claim 9, wherein a variation amount of the density data associated with a temperature variation is less than a variation amount of the chromaticity data associated with the temperature variation.

13. The image forming apparatus according to claim 11, wherein the measurement unit is configured to convert, in a case where the measurement unit measures density of an measurement image formed by using the color material of black, the generated spectral data into the density data by using a visibility spectral characteristic.

14. The image forming apparatus according to claim 1, wherein the image forming unit is configured to form a monochromatic measurement image for detection of the density, and to form a multi-color measurement image for detection of the color.

15. An image forming apparatus comprising:

an image forming unit configured to form a first monochromatic measurement image and a second multi-color measurement image onto a recording paper;

a fixing unit configured to fix the first measurement image and the second measurement image onto the recording paper by heating;

a measurement unit configured to measure the first measurement image and the second measurement image fixed onto the recording paper downstream of the fixing unit in a conveyance direction of the recording paper; and a control unit configured to perform control such that a period of time from when the recording paper passes through the fixing unit until the measurement unit measures the second measurement image becomes longer than a period of time from when the recording paper passes through the fixing unit until the measurement unit measures the first measurement image.

16. The image forming apparatus according to claim 15, wherein, when the measurement unit measures the second measurement image, the control unit is configured to temporarily stop the recording paper during a stop period of time from when the recording paper passes through the fixing unit until the measurement unit performs the color measurement.

17. The image forming apparatus according to claim 16, wherein the control unit is configured to change the stop period of time according to a type of the recording paper.

18. The image forming apparatus according to claim 15, wherein, when the measurement unit measures the second measurement image, the control unit is configured to decrease a conveyance speed of the recording paper during a period of time from when the recording paper passes through the fixing unit until the recording paper arrives at the measurement unit.

19. The image forming apparatus according to claim 18, wherein the control unit is configured to change the decreased conveyance speed according to a type of the recording paper.

20. The image forming apparatus according to claim 15, wherein the measurement unit is configured to measure density of the first measurement image, and to measure color of the second measurement image.

* * * * *